(12) United States Patent
Shtrom

(10) Patent No.: US 10,511,358 B2
(45) Date of Patent: Dec. 17, 2019

(54) BEAMFORMING FOR A MULTI-USER MIMO GROUP

(71) Applicant: Ruckus Wireless, Inc., Sunnyvale, CA (US)

(72) Inventor: Victor Shtrom, Los Altos, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/403,100

(22) PCT Filed: Jul. 21, 2014

(86) PCT No.: PCT/US2014/047392
§ 371 (c)(1),
(2) Date: Jan. 10, 2017

(87) PCT Pub. No.: WO2016/014016
PCT Pub. Date: Jan. 28, 2016

(65) Prior Publication Data
US 2017/0214439 A1    Jul. 27, 2017

(51) Int. Cl.
*H04B 7/04* (2017.01)
*H04B 7/0408* (2017.01)
(Continued)

(52) U.S. Cl.
CPC .......... *H04B 7/0421* (2013.01); *H04B 7/043* (2013.01); *H04B 7/0408* (2013.01);
(Continued)

(58) Field of Classification Search
CPC .... H04B 7/0617; H04B 7/0452; H04B 7/061; H04W 16/28; H04W 88/08
See application file for complete search history.

(56) References Cited

U.S. PATENT DOCUMENTS

2006/0002287 A1    1/2006   Kuwahara ............... 370/208
2009/0097395 A1    4/2009   Zhang .................... 370/203
(Continued)

FOREIGN PATENT DOCUMENTS

WO    WO 2011/071470    6/2011    ............ H04M 1/00

OTHER PUBLICATIONS

International Search Report and Written Opinion for PCT/US2014/047392, dated Feb. 24, 2015.
(Continued)

*Primary Examiner* — David S Huang
(74) *Attorney, Agent, or Firm* — Stewart M. Wiener; Steven E. Stupp

(57) ABSTRACT

During wireless communication with a multi-user multiple-input multiple-output (MIMO) group, a transmitting device may exclude a receiving device from a subset of the multi-user MIMO group to which it communicates data. In particular, based on responses from receiving devices to sounding packets with beamforming information for the receiving devices, the transmitting device calculates beam-pattern settings for a set of antennas so that, when communicating with the subset, receiving devices in the subset are located on beams within beam patterns formed by the set of antennas while a remainder of the receiving devices (including the receiving device) are located at exclusion zones in the beam patterns. Moreover, a beam pattern for a given receiving device in the subset provides a beam at a location of the given receiving device and provides exclusion zones at locations of the other receiving devices in the multi-user MIMO group.

20 Claims, 7 Drawing Sheets

(51) Int. Cl.
    H04B 7/0452    (2017.01)
    H04W 16/28     (2009.01)
    H04W 52/42     (2009.01)
    H04B 7/06      (2006.01)
    H04B 7/0417    (2017.01)
    H04B 7/0426    (2017.01)

(52) U.S. Cl.
    CPC ......... *H04B 7/0452* (2013.01); *H04B 7/0617* (2013.01); *H04W 16/28* (2013.01); *H04W 52/42* (2013.01)

(56) References Cited

U.S. PATENT DOCUMENTS

| | | | |
|---|---|---|---|
| 2011/0032849 A1 | 2/2011 | Yeung et al. | 370/280 |
| 2012/0039196 A1 | 2/2012 | Zhang et al. | 370/252 |
| 2012/0115497 A1 | 5/2012 | Antti Tolli | 455/452.2 |
| 2013/0044650 A1* | 2/2013 | Barker | H04B 7/0617 370/278 |
| 2013/0051256 A1 | 2/2013 | Ong et al. | 370/252 |
| 2013/0176979 A1 | 7/2013 | Ohwatari | 370/329 |
| 2013/0242797 A1 | 9/2013 | Miyata | 370/352 |
| 2013/0287131 A1 | 10/2013 | Hart et al. | 375/267 |
| 2014/0093005 A1 | 4/2014 | Xia et al. | 375/267 |
| 2015/0304011 A1* | 10/2015 | Ponnuswamy | H04B 7/0452 370/329 |
| 2015/0341807 A1* | 11/2015 | Jeffery | H04L 5/005 370/254 |
| 2016/0352002 A1* | 12/2016 | Aue | H01Q 1/246 |

OTHER PUBLICATIONS

European Patent Application No. 14897968.5, Extended European Search Report, dated Mar. 8, 2018.

Examination Report, RE: European Application No. 14897968.5, dated Feb. 5, 2019.

* cited by examiner

BEAMFORMING FOR A MULTI-USER MIMO GROUP

This application claims priority under 35 U.S.C. 371 to International Patent Application No. PCT/US14/47392, "Beamforming for a Multi-User MIMO Group," by Victor Shtrom, filed on Jul. 21, 2014, the contents of which is herein incorporated by reference.

BACKGROUND

Field

The described embodiments relate to techniques for communicating information among electronic devices in a multi-user multiple-input multiple-output (MIMO) group.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In order to improve performance during wireless communication among electronic devices, many electronic devices include multiple antennas that can use beamforming techniques to produce beam patterns comprising beams and nodes or notches. When configured properly, these beam patterns can address the performance challenges in an environment with a multi-path communication channel.

However, it can be difficult to determine the optimal beam patterns (and, thus, the beam-pattern settings) for the multiple antennas in transmitting devices and/or receiving devices. In particular, determining the optimal beam patterns may involve coordination among the transmitting devices and the receiving devices, which may not be supported by existing communication protocols and/or by the associated networking subsystems in the transmitting devices and the receiving devices.

SUMMARY

The described embodiments relate to a transmitting device that includes: an interface circuit that communicates, via connections, with receiving devices. During operation, the interface circuit: provides sounding packets to the receiving devices; receives responses to the sounding packets from the receiving devices with beamforming information for the receiving devices; and calculates beam-pattern settings for a set of antennas so that, when communicating with a subset of the receiving devices, the receiving devices in the subset are located on beams within beam patterns formed by the set of antennas while a remainder of the receiving devices are located at exclusion zones in the beam patterns. In this way, a beam pattern for a given receiving device provides a beam at a location of the given receiving device and provides exclusion zones at locations of the other receiving devices. This enables the transmitting device to transmit data to the subset of the receiving devices based on the calculated beam-pattern settings.

Moreover, the transmitting device may include the set of antennas.

Note that the remainder of the receiving devices may include an access point. Moreover, the set of antennas may include N antennas in the set of antennas and there may be N−1 exclusion zones, where N is an integer.

In some embodiments, if a beam-exclusion zone conflict occurs for a given receiving device, the interface circuit includes the given receiving device in the subset of the receiving devices. Alternatively, if a beam-exclusion zone conflict occurs for a given receiving device, the interface circuit excludes the given receiving device from the calculating and the transmitting operations.

Furthermore, the receiving devices may be a multi-user multiple-input multiple-output (MIMO) group.

Another embodiment provides a transmitting device that includes the interface circuit, where the interface circuit communicates with receiving devices in a multi-user multiple-input multiple-output (MIMO). Moreover, the transmitting device may aggregate the receiving devices in the multi-user MIMO group, and may communicate data with a subset of the multi-user MIMO group. Furthermore, a remainder of the multi-user MIMO group, which excludes the subset, may include an access point.

Another embodiment provides a transmitting device that includes the interface circuit. This interface circuit includes an access point as a client in the MIMO group, and selects a beam pattern so that the transmitting device intentionally excludes the access point from communication with the transmitting device.

Another embodiment provides a communication circuit. This communication circuit includes: nodes that can couple to a set of antennas; and an interface circuit. This communication circuit may perform operations described above for either of the preceding embodiments of the transmitting device.

Another embodiment provides a computer-program product for use with the transmitting device. This computer-program product includes instructions for at least some of the operations performed by the preceding embodiments of the transmitting device.

Another embodiment provides a method for communicating among a transmitting device and the receiving devices. This method includes at least some of the operations performed by the preceding embodiments of the transmitting device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to maintain the communication performance of a receiving device during wireless communication with a multi-user multiple-input multiple-output (MIMO) group that includes the receiving device, a transmitting device (such as an access point) may exclude the receiving device from a subset of the multi-user MIMO group to which it communicates data. In particular, based on responses from receiving devices to sounding packets with beamforming information for the receiving devices, the transmitting device calculates beam-pattern settings for a set of antennas so that, when communicating with the subset, receiving devices in the subset are located on beams within beam patterns formed by the set of antennas while a remainder of the receiving devices (including the receiving device) are located at exclusion zones in the beam patterns. Moreover, a beam pattern for a given receiving device in the subset provides a beam at a location of the given receiving device and provides exclusion zones at locations of the other receiving devices in the multi-user MIMO group.

By excluding the receiving device from the subset (and ensuring that the receiving device is located at exclusion zones in the beam patterns for the subset), the transmitting device may reduce signals in the direction of the receiving device (which may reduce interference at the receiving device). Thus, the transmitting device may protect the throughput of the receiving device. For example, the transmitting device may protect another access point in the multi-user MIMO group from its transmissions, thereby improving the performance of the other access point and improving the user experience when communicating with the transmitting device and/or the receiving device.

In the discussion that follows the transmitting and the receiving devices include radios that communicate packets in accordance with a communication protocol, such as an Institute of Electrical and Electronics Engineers (IEEE) 802.11 standard (which is sometimes referred to as 'Wi-Fi®,' from the Wi-Fi® Alliance of Austin, Tex.), Bluetooth™ (from the Bluetooth Special Interest Group of Kirkland, Wash.), and/or another type of wireless interface. In the discussion that follows, Wi-Fi® (and, in particular, IEEE 802.11ac) is used as an illustrative example. However, a wide variety of communication protocols may be used.

Figure 1:
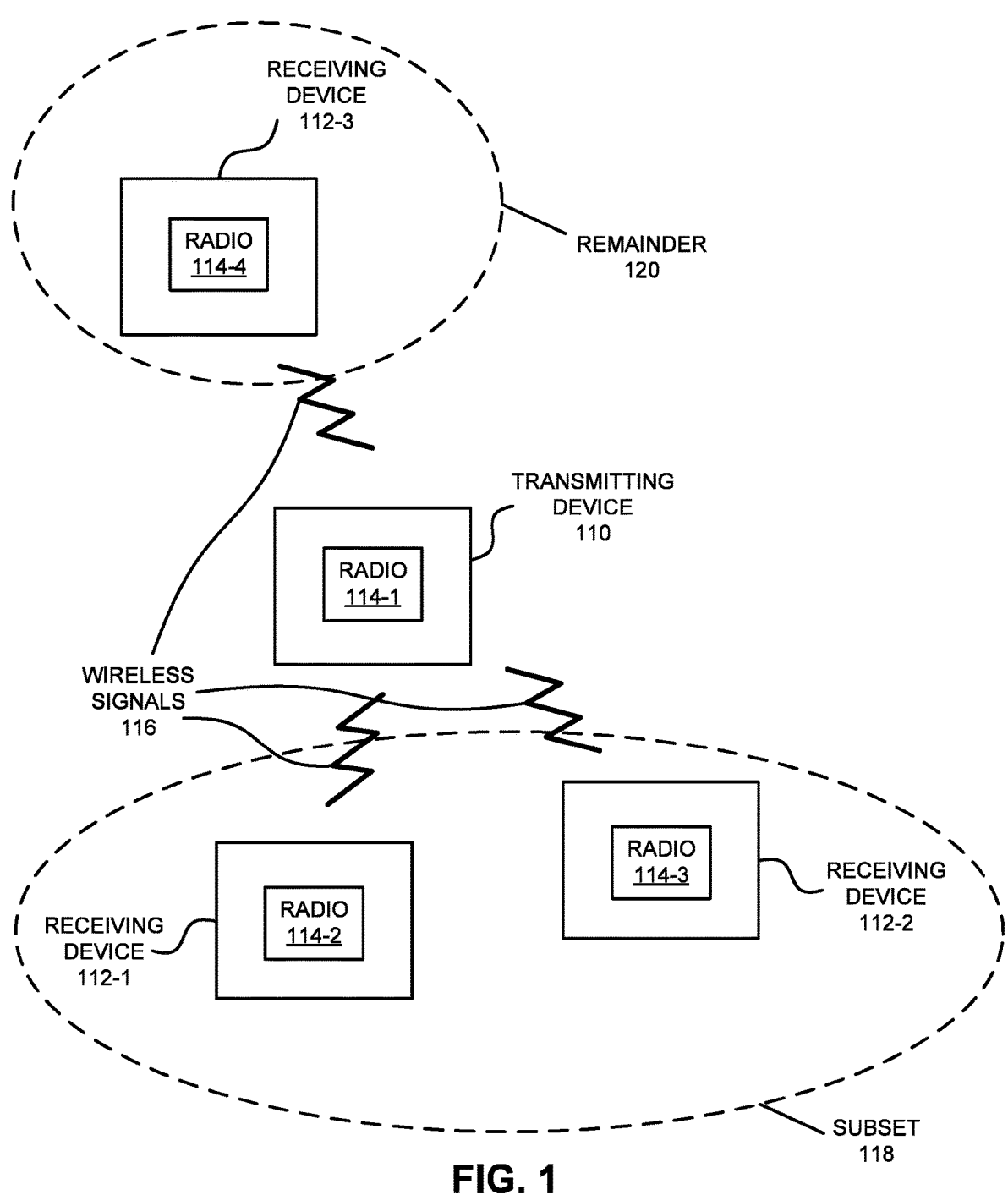
FIG. 1 is a block diagram illustrating electronic devices wirelessly communicating in accordance with an embodiment of the present disclosure.

Communication among electronic devices is shown in FIG. 1, which presents a block diagram illustrating transmitting device 110 (such as an access point) and receiving devices 112 (such as portable electronic devices, e.g., cellular telephones) wirelessly communicating in accordance with some embodiments. (Note that transmitting device 110 may have aggregated receiving devices 112 into a multi-user MIMO group, e.g., the same physical group in the media-access-control sublayer.) In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads). In some embodiments, at least one of receiving devices 112 (such as receiving device 112-3) is another access point.

Figure 6:
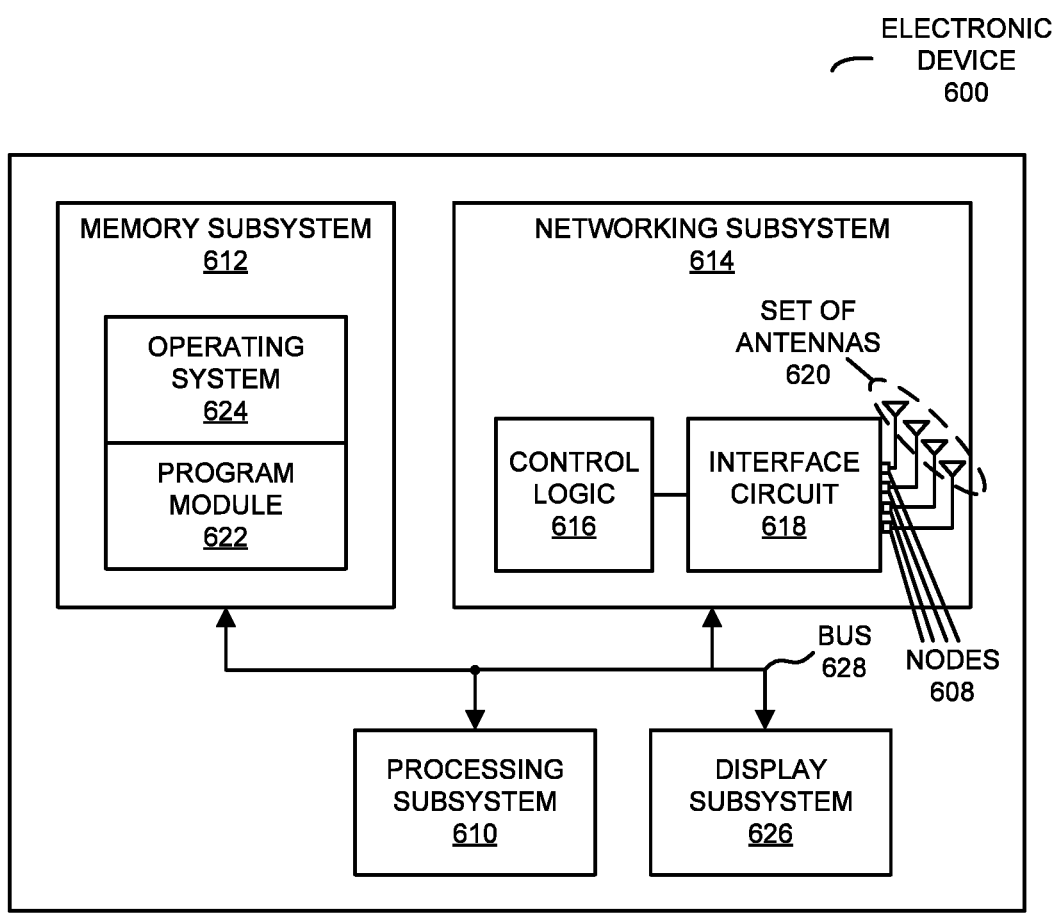
FIG. 6 is a block diagram illustrating one of the electronic devices of FIG. 1 in accordance with an embodiment of the present disclosure.

As described further below with reference to FIG. 6, transmitting device 110 and receiving devices 112 may include subsystems, such as a networking subsystem, a memory subsystem and a processor subsystem. In addition, transmitting device 110 and receiving devices 112 may include radios 114 in the networking subsystems. More generally, transmitting device 110 and receiving devices 112 can include (or can be included within) any electronic devices with the networking subsystems that enable transmitting device 110 and receiving devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by jagged lines) are transmitted from a radio 114-1 in transmitting device 110. These wireless signals 116 are received by radios 114 in receiving devices 112. In particular, transmitting device 110 may transmit packets. In turn, these packets may be received by at least the one of receiving devices 112. This may allow transmitting device 110 to communicate information to receiving devices 112. Note that the communication between transmitting device 110 and a given one of receiving devices 112 (such as receiving device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication between transmitting device 110 and a given one of receiving devices 112 is characterized by an error-rate model, which compares the error rate during communication at the data rate.

However, the transmissions from transmitting device 110 may interfere with those from one or more of receiving devices 112 (such as receiving device 112-3). This interference may degrade the throughput and, more generally, the performance of receiving device 112-3. This interference may be undesirable, especially if transmitting device 110 does not regularly communicate with receiving device 112-3. For example, transmitting device 110 and receiving device 112-3 may each be access points. In order to avoid this problem (and, thus, to protect receiving device 112-3 from its transmissions), transmitting device 110 may implement embodiments of the communication technique described further below with reference to FIG. 2. In particular, transmitting device 110 may divide receiving devices 112 in the multi-user MIMO group into a subset 118 of receiving devices 112 with which transmitting device 110 communicates data, and a remainder 120 of receiving devices 112 (which includes receiving device 112-3) with which transmitting device 110 does not communicate data.

Then, transmitting device 110 may determine beam-pattern settings (such as a steering matrix) so that the receiving devices in subset 118 are located at beams in beam patterns output by a set of antennas in transmitting device 110, and the receiving devices in remainder 120 are located at exclusion zones in the beam patterns. Furthermore, transmitting device 110 may use the calculated beam-pattern settings to transmit data (e.g., in packets) to the receiving devices in subset 118. In particular, when transmitting data to a given receiving device in subset 118, transmitting device 110 may apply one of the beam-pattern settings to the set of antennas.

For example, transmitting device 110 may determine amplitudes or weights and phases for signals to the set of antennas in transmitting device 110 that form beam patterns (such as via a matrix calculation that determines a steering vector). As illustrated below with reference to FIG. 4, the beam pattern used to communicate with a given receiving device in subset 118 may have a beam at the location of the given receiving device and exclusion zones at the locations of the other receiving devices in receiving devices 112. Note that the set of antennas may include N antennas in the set of antennas and there may be N−1 notches, where N is an integer. Moreover, note that an 'exclusion zone' of a beam pattern (which is sometimes referred to as a 'notch' or a 'null') includes a low-intensity region of the beam pattern. While the intensity is not necessarily zero in the exclusion zone, it may be below a threshold such as 3 dB or lower than the peak gain of the beam pattern. Thus, the beam pattern may include a local maximum that directs gain in the direction of the given receiving device that is of interest, and one or more local minima that reduce gain in the direction of the other receiving devices that are not of interest. In this way, the beam pattern may be selected so that communication that is undesirable (such as with the other receiving devices) is avoided to reduce or eliminate adverse effects, such as interference.

In some embodiments, if a beam-exclusion zone conflict occurs for a given receiving device when the beam-pattern settings are calculated, transmitting device 110 may include the given receiving device in subset 118. Alternatively, if a beam-exclusion zone conflict occurs for a given receiving device when the beam-pattern settings are calculated, transmitting device 110 may exclude the given receiving device from the calculation of the beam-pattern settings and, thus, from the subsequent transmission of the data to subset 118. Consequently, if a beam-exclusion zone conflict occurs for a given receiving device, transmitting device 110 may change subset 118 and/or the multi-user MIMO group. For example, transmitting device 110 may replace the given receiving device in subset 118 with one of the receiving devices in remainder 120 and/or transmitting device 110 may remove the given receiving device from the multi-user MIMO group. Furthermore, if the given receiving device is in the same area as a calculated exclusion zone in the beam pattern, a beam may instead be placed there to ensure the ability to communicate with the given receiving device.

While the preceding discussion provides an illustration of the operations performed by transmitting device 110 in the communication technique, as described below with reference to FIG. 3, more generally transmitting device 110 may aggregate receiving devices 112 in the multi-user MIMO group, and may communicate data with subset 118 of the multi-user MIMO group. Furthermore, transmitting device 110 may not communicate data with remainder 120 of the multi-user MIMO group (which excludes subset 118). As noted previously, this may protect one or more of the receiving devices in remainder 120 (such as an access point) when the data are communicated with subset 118.

In the described embodiments, processing a packet or frame in transmitting device 110 and/or receiving devices 112 includes: receiving wireless signals 116 with the packet or frame; decoding/extracting the packet or frame from received wireless signals 116 to acquire the packet or frame; and processing the packet or frame to determine information contained in the packet or frame (such as sounding packets, responses with beamforming information, etc.).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
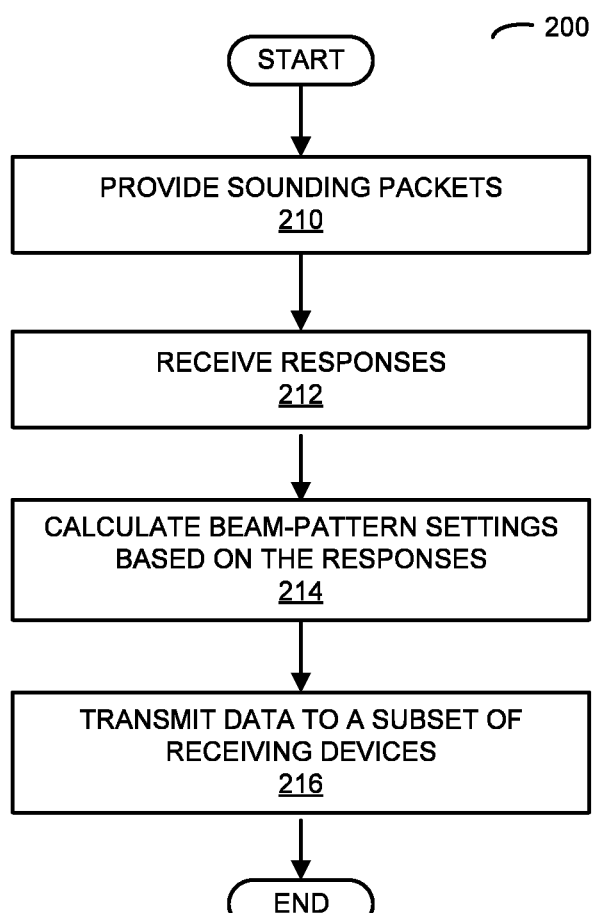
FIG. 2 is a flow diagram illustrating a method for communicating between a transmitting device and receiving devices during communication among the electronic devices in FIG. 1 in accordance with an embodiment of the present disclosure.

FIG. 2 presents a flow diagram illustrating method 200 for communicating between a transmitting device and receiving devices in accordance with some embodiments, which may be implemented by the transmitting device and/or a communication circuit in the transmitting device. For example, the transmitting device may be transmitting device 110 (FIG. 1).

During operation, the transmitting device provides sounding packets (operation 210) to the receiving devices. Then, the transmitting device receives responses (operation 212) to the sounding packets from the receiving devices including beamforming information for the receiving devices. Moreover, based on the responses, the transmitting device calculates beam-pattern settings (operation 214) for a set of antennas in the transmitting device so that, when communicating with a subset of the receiving devices, receiving devices in the subset are located on beams within beam patterns formed by the set of antennas while a remainder of the receiving devices are located at exclusion zones in the beam patterns. Note that a beam pattern for a given receiving device provides a beam at a location of the given receiving device and provides exclusion zones at locations of the other receiving devices. Next, the transmitting device transmits data to the subset of the receiving devices (operation 216) based on the calculated beam-pattern settings.

Figure 3:
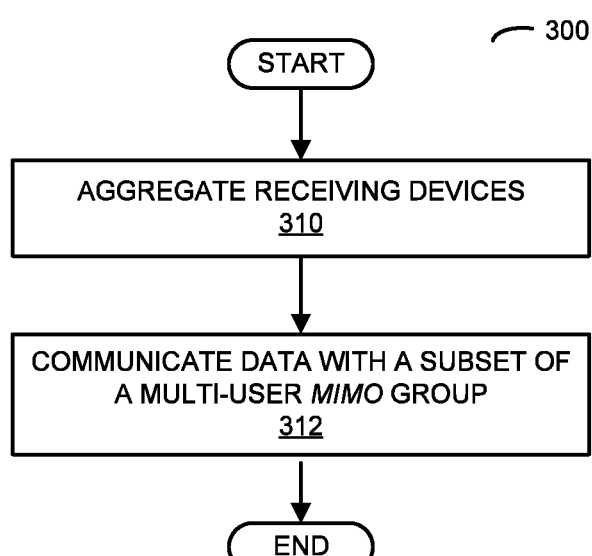
FIG. 3 is a flow diagram illustrating a method for communicating data with a subset of a multi-user multiple-input multiple-output (MIMO) group in accordance with an embodiment of the present disclosure.

FIG. 3 presents a flow diagram illustrating a method 300 for communicating data with a subset of a multi-user MIMO group in accordance with some embodiments, which may be implemented by the transmitting device and/or the communication circuit in the transmitting device. For example, the transmitting device may be transmitting device 110 (FIG. 1).

During operation, the transmitting device aggregates receiving devices (operation 310) in a multi-user MIMO group. Then, the transmitting device communicates data with a subset of the multi-user MIMO group (operation 312), while excluding communication with a remainder of the multi-user MIMO group. As noted previously, this may involve the transmitting device calculating beam-pattern settings for the set of antennas that result in beam patterns with beams at the locations of the receiving devices in the subset and exclusion zones at the locations of the receiving devices in the remainder (which excludes the subset).

In these ways, the transmitting device (for example, an interface circuit in the transmitting device) may facilitate communication with the subset of the receiving devices while protecting the remainder of the receiving devices. Consequently, this communication technique may facilitate high performance communication among the transmitting device and the receiving devices.

In some embodiments of methods 200 (FIG. 2) and/or 300, there may be additional or fewer operations. Additionally, the order of the operations in methods 200 (FIG. 2) and/or 300 may be changed, and/or two or more operations may be combined into a single operation.

In an exemplary embodiment, the transmitting device sends sounding, or test packets or frames, to the receiving devices in the multi-user MIMO group. These test packets may have zero length. For example, the transmitting device may send a sounding packet at each of the receiving devices (which may include another access point) as if the receiving devices were clients of the transmitting device. In response, the receiving devices may send test matrices that specify beamforming information (such as beam weights) for the receiving devices to the transmitting device. Then, the transmitting device may use these responses to calculate the beam-pattern settings, such as amplitudes and phases of subcarriers in orthogonal frequency-division multiplexing.

Figure 4:
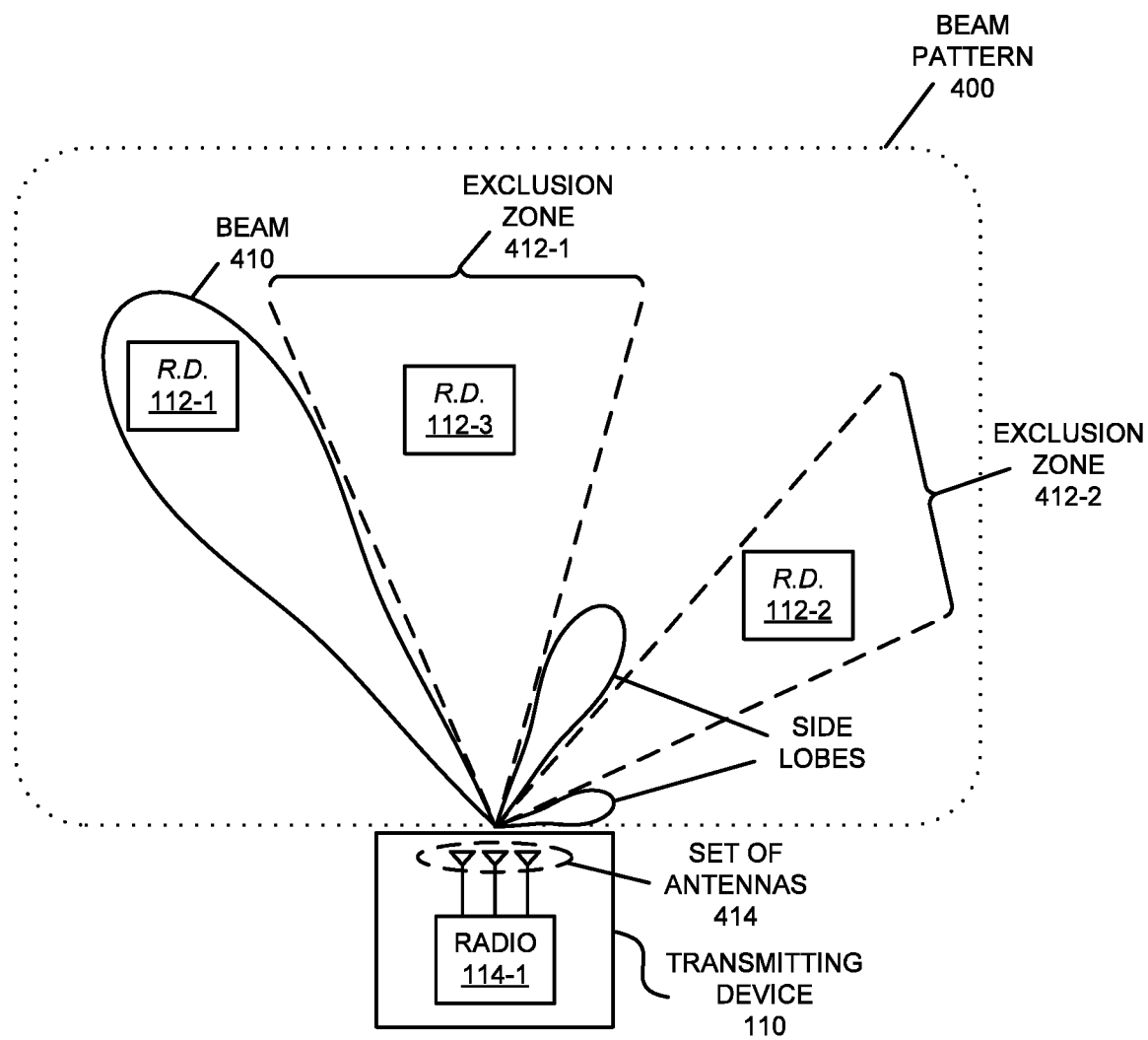
FIG. 4 is a drawing illustrating a beam pattern during communication among the electronic devices in FIG. 1 in accordance with an embodiment of the present disclosure.

FIG. 4 presents a drawing illustrating beam pattern 400 used to communicate with a given one of receiving devices 112 in FIG. 1 (such as receiving device or R.D. 112-1) in accordance with some embodiments. In particular, this beam pattern may have a beam 410 at the location of receiving device 112-1 and exclusion zones 412 at the locations of receiving devices 112-2 and 112-3. The beam-pattern settings may result in similar beam patterns for the other receiving devices in subset 118 (FIG. 1), i.e., with a beam at the location of a given receiving device and exclusion zones at the locations of the other receiving devices. Collectively, the beam-pattern settings may produce beam patterns that have beams at the locations of the receiving devices in subset 118 (FIG. 1) and exclusion zones at the locations of the receiving devices in remainder 120 (FIG. 1). Note that the set of antennas in transmitting device 110 may include N antennas in the set of antennas and there may be N−1 exclusion zones, where N is an integer. Thus, as illustrated in FIG. 4, transmitting device 110 may include a set of antennas 414 with three antennas that produces (in response to signals corresponding to one of the beam-pattern settings) beam pattern 400 with two exclusion zones 412 at the locations of receiving devices 112-2 and 112-3. More generally, transmitting device 110 may include more antennas than clients for which it has data. These degrees of freedom may be used to generate beam patterns with exclusion zones at the desired locations.

Figure 5:
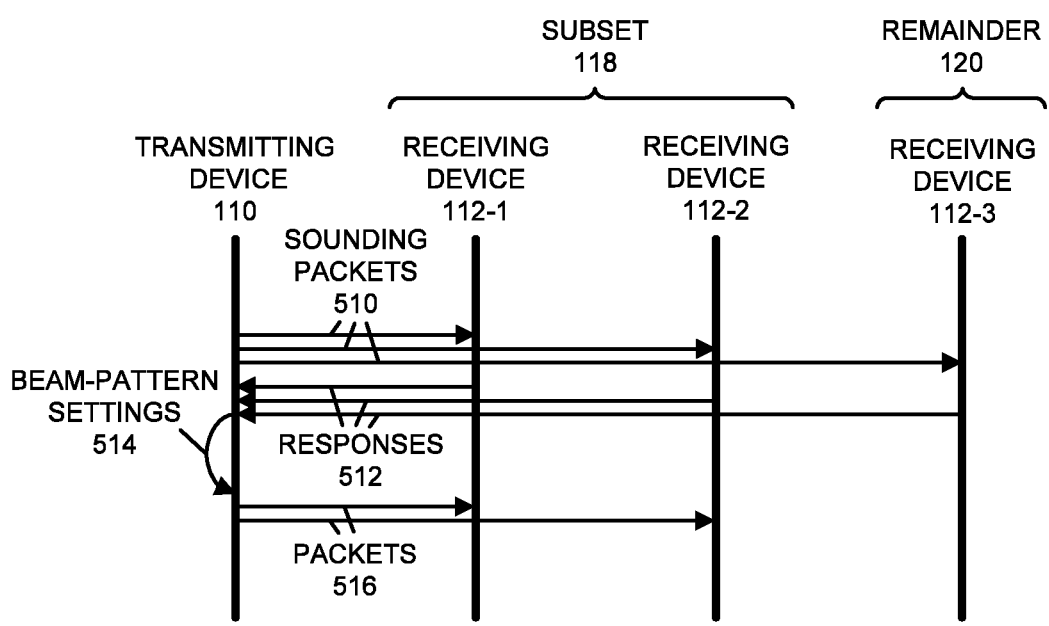
FIG. 5 is a drawing illustrating communication among the electronic devices in FIG. 1 in accordance with an embodiment of the present disclosure.

The communication technique is further illustrated in FIG. 5, which presents a drawing illustrating communication among transmitting device 110 and receiving devices 112 in accordance with some embodiments. In particular, transmitting device 110 may provide sounding packets 510 to receiving devices 112. In response, receiving devices 112 may provide response packets 512 with beamforming information for receiving devices 112. Using the beamforming information, transmitting device 110 may calculate beam-pattern settings 514 for a set of antennas in transmitting device 110 that are used to generate beam patterns when transmitting data or information to subset 118 of receiving devices 112. In particular, the receiving devices in subset 118 may be located at beams in the beam patterns, while the receiving devices in remainder 120 may be located at exclusion zones in the beam patterns. Then, transmitting device 110 may transmit packets 516 to the receiving devices in subset 118.

We now describe embodiments of the electronic device. FIG. 6 presents a block diagram illustrating an electronic device 600 in accordance with some embodiments, such as transmitting device 110 or one of receiving devices 112 in FIG. 1. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and a set of antennas 620. (While FIG. 6 includes set of antennas 620, in some embodiments electronic device 600 includes one or more nodes, such as nodes 608, e.g., pads, which can be coupled to set of antennas 620. Thus, electronic device 600 may or may not include set of antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 600, in alternative embodiments, different components and/or subsystems may be present in electronic device 600. For example, electronic device 600 may include one or more additional processing subsystems 610, memory subsystems 612, networking subsystems 614, and/or display subsystems 626. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Figure 7:
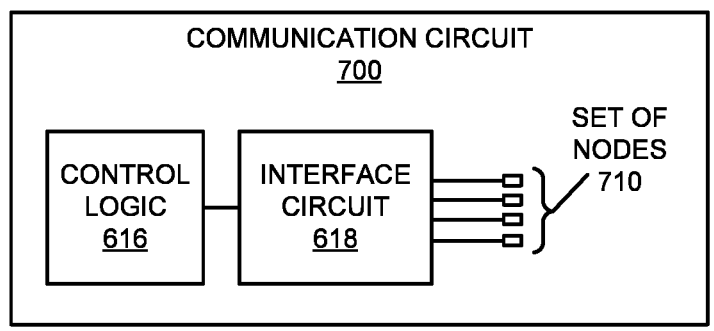
FIG. 7 is a block diagram illustrating a communication circuit for use in the one of the electronic devices in FIG. 1 in accordance with an embodiment of the present disclosure.

An integrated circuit (which is sometimes referred to as a 'communication circuit') may implement some or all of the functionality of networking subsystem 614. This is illustrated in FIG. 7, which presents a block diagram of communication circuit 700 in accordance with some embodiments. In particular, communication circuit 700 may include: control logic 616, an interface circuit 618 and a set of nodes 710 (such as pads) that can couple to set of antennas 620 (FIG. 6).

Referring back to FIG. 6, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, calculating the beam-pattern settings, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While a communication protocol compatible with Wi-Fi® was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

Moreover, while the preceding embodiments excluded communication of data from transmitting device 110 (FIG. 1) to the receiving devices in remainder 120 (FIG. 1), in some embodiments there is indirect communication between transmitting device 110 (FIG. 1) and at least one of the receiving devices in remainder 120 (FIG. 1). For example, transmitting device 110 (FIG. 1) may communicate data to one or more of the receiving devices in subset 118 (FIG. 1), and the one or more of the receiving devices in subset 118 (FIG. 1) may communicate the data to at least the one of the receiving devices in remainder 120 (FIG. 1).

Furthermore, while the preceding embodiments illustrated the use of the communication technique and methods 200 (FIG. 2) and 300 (FIG. 3) in transmitting device 110 (FIG. 1), in other embodiments the calculation of the beam-pattern settings is performed remotely in a system per radio, per wireless network, per client, etc. Thus, at least some of the operations in the communication technique and methods 200 (FIG. 2) and 300 (FIG. 3) may be performed by a remote electronic device or server. For example, the calculation of the beam-pattern settings may be performed by a central server and then may be provided to transmitting device 110 (FIG. 1).

While the preceding embodiments illustrated the use of the communication technique with a multi-user MIMO group, in other embodiments the communication technique may be used with: multiple input and single output (MISO), co-operative MIMO in which the set of antennas may be distributed over more than one transmitting device, macrodiversity MIMO, and MIMO routing.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A transmitting device, comprising an interface circuit configured to communicate, via connections, with receiving devices, wherein the interface circuit is configured to:
    provide, to one or more output nodes of the transmitting device, sounding packets to the receiving devices, wherein the receiving devices comprise a multi-user multiple-input multiple-output (MIMO) group;
    receive, from one or more input nodes of the transmitting device, responses to the sounding packets from the receiving devices with beamforming information for the receiving devices;
    dynamically select a subset of the receiving devices in the multi-user MIMO group by calculating beam-pattern settings for a set of antennas so that, when communicating with the subset of the receiving devices in the multi-user MIMO group, receiving devices in the subset are located on beams within beam patterns formed by the set of antennas while a remainder of the receiving devices in the multi-user MIMO group are located at exclusion zones in the beam patterns, wherein a beam pattern for a given receiving device provides a beam at a location of the given receiving device and provides exclusion zones at locations of the other receiving devices, and wherein the remainder of the receiving devices comprises at least a receiving device that is other than an access point; and
    transmit, to the one or more output nodes, data to the subset of the receiving devices in the multi-user MIMO group based on the calculated beam-pattern settings, wherein the subset of the receiving devices comprises multiple receiving devices, wherein the data is communicated using a communication protocol that is different from a cellular-telephone communication protocol.

2. The transmitting device of claim 1, further comprising the set of antennas coupled to the interface circuit.

3. The transmitting device of claim 1, wherein the remainder of the receiving devices includes an access point.

4. The transmitting device of claim 1, wherein there are N antennas in the set of antennas and N−1 exclusion zones; and where N is an integer.

5. The transmitting device of claim 1, wherein, when a beam-exclusion zone conflict occurs for a given receiving device, the interface circuit is configured to include the given receiving device in the subset of the receiving devices in the multi-user MIMO group.

6. The transmitting device of claim 1, wherein, if a beam-exclusion zone conflict occurs for a given receiving device, the interface circuit is configured to exclude the given receiving device from the calculating and the transmitting operations.

7. A transmitting device, comprising an interface circuit configured to communicate, via connections, with receiving devices, wherein the receiving devices comprise a multi-user multiple-input multiple-output (MIMO) group; and
    wherein the transmitting device is configured to:
        aggregate the receiving devices in the multi-user MIMO group;
        provide, to one or more output nodes of the transmitting device, sounding packets to the receiving devices;
        receive, from one or more input nodes of the transmitting device, responses to the sounding packets from the receiving devices with beamforming information for the receiving devices;
        dynamically select a subset of the receiving devices in the multi-user MIMO group by calculating beam-pattern settings for a set of antennas so that, when communicating with the subset of the receiving devices in the multi-user MIMO group, receiving devices in the subset are located on beams within beam patterns formed by the set of antennas while a remainder of the receiving devices in the multi-user MIMO group are located at exclusion zones in the beam patterns, wherein a beam pattern for a given receiving device provides a beam at a location of the given receiving device and provides exclusion zones at locations of the other receiving devices, and wherein the remainder of the receiving devices comprises at least a receiving device that is other than an access point; and
        transmit, to the one or more output nodes, data to the subset of the receiving devices in the multi-user MIMO group based on the calculated beam-pattern settings, wherein the subset of the receiving devices in the multi-user MIMO group comprises multiple receiving devices, and wherein the data is communicated using a communication protocol that is different from a cellular-telephone communication protocol.

8. The transmitting device of claim 7, wherein the remainder of the receiving devices includes an access point.

9. A transmitting device, comprising an interface circuit configured to:

include an access point as a client in a multi-user multiple-input multiple-output (MIMO) group;

provide, to one or more output nodes of the transmitting device, sounding packets to the multi-user MIMO group;

receive, from one or more input nodes of the transmitting device, responses to the sounding packets from the multi-user MIMO group with beamforming information for the multi-user MIMO group;

dynamically select a subset of receiving devices in the multi-user MIMO group by calculating beam-pattern settings for a set of antennas so that the transmitting device intentionally excludes the access point from communication with the transmitting device when the transmitting device communicates with the subset of the receiving devices in the MIMO group, wherein the receiving devices in the subset are located on beams within beam patterns formed by the set of antennas while a remainder of the receiving devices in the multi-user MIMO group are located at exclusion zones in the beam patterns, and wherein the remainder of the receiving devices comprises at least a receiving device that is other than an access point; and transmit, to the one or more output nodes, data to the subset of the receiving devices in the multi-user MIMO group based on the selected beam-pattern settings, wherein at least the subset of the receiving devices in the multi-user MIMO group comprises multiple receiving devices, and wherein the data is communicated using a communication protocol that is different from a cellular-telephone communication protocol.

10. The communication circuit of claim 9, wherein the access point is at an exclusion zone in beam patterns corresponding to the selected beam-pattern settings, and the subset of the receiving devices in the MIMO group is located on beams within the beam patterns corresponding to the selected beam-pattern settings.

11. A communication circuit, comprising:

nodes configured to couple to a set of antennas; and an interface circuit configured to:

provide, to one or more output nodes in the nodes, sounding packets to receiving devices, wherein the receiving devices comprise a multi-user multiple-input multiple-output (MIMO) group;

receive, from one or more input nodes in the nodes, responses to the sounding packets from the receiving devices with beamforming information for the receiving devices;

dynamically select a subset of the receiving devices in the multi-user MIMO group by calculating beam-pattern settings for the set of antennas so that, when communicating with the subset of the receiving devices in the multi-user MIMO group, receiving devices in the subset are located on beams within beam patterns formed by the set of antennas while a remainder of the receiving devices in the multi-user MIMO group are located at exclusion zones in the beam patterns, wherein a beam pattern for a given receiving device provides a beam at a location of the given receiving device and provides exclusion zones at locations of the other receiving devices, and wherein the remainder of the receiving devices comprises at least a receiving device that is other than an access point; and transmit, to the one or more output nodes, data to the subset of the receiving devices in the multi-user MIMO group based on the calculated beam-pattern settings, wherein the subset of the receiving devices in the multi-user MIMO group comprises multiple receiving devices, and wherein the data is communicated using a communication protocol that is different from a cellular-telephone communication protocol.

12. The communication circuit of claim 11, wherein the remainder of the receiving devices includes an access point.

13. The communication circuit of claim 11, wherein there are N antennas in the set of antennas and N−1 exclusion zones; and where N is an integer.

14. The communication circuit of claim 11, wherein, when a beam-exclusion zone conflict occurs for a given receiving device, the interface circuit is configured to include the given receiving device in the subset of the receiving devices in the multi-user MIMO group.

15. The communication circuit of claim 11, wherein, if a beam-exclusion zone conflict occurs for a given receiving device, the interface circuit is configured to exclude the given receiving device from the calculating and the transmitting operations.

16. A method for communicating between a transmitting device and receiving devices, wherein the method comprises:

providing, to one or more output nodes of the transmitting device, sounding packets to the receiving devices, wherein the receiving devices comprise a multi-user multiple-input multiple-output (MIMO) group;

receiving, from one or more input nodes of the transmitting device, responses to the sounding packets from the receiving devices including beamforming information for the receiving devices;

dynamically selecting a subset of the receiving devices in the multi-user MIMO group by calculating beam-pattern settings for a set of antennas in the transmitting device so that, when communicating with the subset of the receiving devices in the multi-user MIMO group, receiving devices in the subset are located on beams within beam patterns formed by the set of antennas while a remainder of the receiving devices in the multi-user MIMO group are located at exclusion zones in the beam patterns, wherein a beam pattern for a given receiving device provides a beam at a location of the given receiving device and provides exclusion zones at locations of the other receiving devices, and wherein the remainder of the receiving devices comprises at least a receiving device that is other than an access point; and transmitting, to the one or more output nodes, data to the subset of the receiving devices in the multi-user MIMO group based on the calculated beam-pattern settings, wherein the subset of the receiving devices in the multi-user MIMO group comprises multiple receiving devices, and wherein the data is communicated using a communication protocol that is different from a cellular-telephone communication protocol.

17. The method of claim 16, wherein the remainder of the receiving devices includes an access point.

18. The method of claim 16, wherein there are N antennas in the set of antennas and N−1 exclusion zones; and
where N is an integer.

19. The method of claim 16, wherein, when a beam-exclusion zone conflict occurs for a given receiving device, the given receiving device is included in the subset of the receiving devices in the multi-user MIMO group.

20. The method of claim 16, wherein, if a beam-exclusion zone conflict occurs for a given receiving device, the given receiving device is excluded from the calculating and the transmitting operations.

* * * * *